US009617001B2

(12) United States Patent
Zimmermann

(10) Patent No.: US 9,617,001 B2
(45) Date of Patent: Apr. 11, 2017

(54) HOLDING DEVICE FOR A DISPLAY AND/OR OPERATING UNIT FOR ATTACHING IN AN AIRCRAFT AND DISPLAY AND OPERATING DEVICE WITH A HOLDING DEVICE

(71) Applicant: ZIM Flugsitz GmbH, Markdorf (DE)

(72) Inventor: Angelika Zimmermann, Ueberlingen (DE)

(73) Assignee: ZIM Flugsitz GmbH, Markdorf (DE)

( * ) Notice: Subject to any disclaimer, the term of this patent is extended or adjusted under 35 U.S.C. 154(b) by 190 days.

(21) Appl. No.: 14/674,036

(22) Filed: Mar. 31, 2015

(65) Prior Publication Data

US 2015/0274295 A1 Oct. 1, 2015

(30) Foreign Application Priority Data

Apr. 1, 2014 (DE) .................... 20 2014 101 544 U

(51) Int. Cl.
*B64D 11/06* (2006.01)
*B60R 11/02* (2006.01)
(Continued)

(52) U.S. Cl.
CPC ...... *B64D 11/0015* (2013.01); *B60R 11/0235* (2013.01); *B64D 11/00153* (2014.12);
(Continued)

(58) Field of Classification Search
CPC .......... B64D 11/00153; B64D 11/0015; B60R 2011/0082
See application file for complete search history.

(56) References Cited

U.S. PATENT DOCUMENTS 5,096,271 A * 3/1992 Portman .......... B64D 11/00153
244/118.5
5,177,616 A * 1/1993 Riday ................ B64D 11/0015
248/917
(Continued)

FOREIGN PATENT DOCUMENTS

DE 10 2010 019 847 A1 11/2011
DE 10 2010 019 849 A1 11/2011

OTHER PUBLICATIONS

German Search Report (Application No. 20 2014 101 544.2) dated Dec. 18, 2014.
(Continued)

*Primary Examiner* — Justin Larson
(74) *Attorney, Agent, or Firm* — Burr & Brown, PLLC

(57) ABSTRACT

A holding device for a display and/or operating unit for use in an aircraft on an aircraft seat is proposed, with a holding arm and an attachment device and a coupling unit for connecting the display and/or operating unit, wherein one end region of the holding arm is provided on the attachment device so as to be pivotable about an axis of rotation and the coupling unit for pivotably connecting the display and/or operating unit is provided on the opposite end region of the holding arm, and wherein the holding arm can take up a use position and a storage position on the attachment device. According to the invention, a spiral spring unit is arranged between the attachment device and the holding arm is such a manner that a torque is exerted on the holding arm by the spiral spring unit.

17 Claims, 4 Drawing Sheets

(51) Int. Cl.
  *B64D 11/00* (2006.01)
  *B60R 11/00* (2006.01)

(52) U.S. Cl.
  CPC ... *B64D 11/0646* (2014.12); *B60R 2011/0082* (2013.01); *B60R 2011/0089* (2013.01)

(56) References Cited

U.S. PATENT DOCUMENTS

| | | | | |
|---|---|---|---|---|
| 5,709,360 | A * | 1/1998 | Rosen | B60N 2/468 248/278.1 |
| 5,996,954 | A * | 12/1999 | Rosen | B60R 11/0235 248/278.1 |
| 6,007,036 | A * | 12/1999 | Rosen | B60R 11/0235 224/281 |
| 6,179,263 | B1 | 1/2001 | Rosen et al. | |
| 6,424,386 | B1 * | 7/2002 | Shimizu | B64D 11/0015 312/223.1 |
| 6,427,957 | B1 * | 8/2002 | Finneman | B60N 2/4686 248/185.1 |
| 6,997,301 | B1 | 2/2006 | Seeley et al. | |
| 7,042,528 | B2 * | 5/2006 | Lester | B60R 11/0235 348/825 |
| 7,261,266 | B2 * | 8/2007 | Satterfield | B60R 11/0235 248/284.1 |
| 7,293,632 | B2 * | 11/2007 | Shirokoshi | F16M 11/10 188/188 |
| 8,322,670 | B2 * | 12/2012 | Westerink | B64D 11/0015 16/363 |
| 8,997,660 | B2 * | 4/2015 | Satterfield | A47B 31/06 108/44 |
| 9,010,852 | B1 * | 4/2015 | Conrad | B60R 11/0229 297/135 |
| 2005/0140191 | A1 * | 6/2005 | Curran | B60K 35/00 297/217.3 |
| 2006/0219857 | A1 * | 10/2006 | Satterfield | B60R 11/0235 248/284.1 |
| 2007/0108826 | A1 * | 5/2007 | Kojima | B60N 2/1615 297/374 |
| 2014/0300147 | A1 * | 10/2014 | Suhre | B60N 2/4606 297/170 |
| 2015/0048230 | A1 * | 2/2015 | Satterfield | F16M 11/121 248/278.1 |
| 2015/0274295 | A1 * | 10/2015 | Zimmermann | B64D 11/00153 224/401 |
| 2015/0274296 | A1 * | 10/2015 | Zimmermann | B64D 11/06 361/679.56 |

OTHER PUBLICATIONS

U.S. Appl. No. 14/674,001, filed Mar. 31, 2015, Zimmerman, Angelika.

* cited by examiner

HOLDING DEVICE FOR A DISPLAY AND/OR OPERATING UNIT FOR ATTACHING IN AN AIRCRAFT AND DISPLAY AND OPERATING DEVICE WITH A HOLDING DEVICE

This application claims the benefit under 35 USC §119 (a)-(d) of German Application No. 20 2014 101 544.2 filed Apr. 1, 2014, the entirety of which is incorporated herein by reference.

FIELD OF THE INVENTION

The invention relates to a holding device for a display and/or operating unit for use in an aircraft and to a display and/or operating device with a holding device.

BACKGROUND OF THE INVENTION

It is known to attach what is referred to as a "video arm" to aircraft seats. A video arm generally comprises a holding arm which is fastened pivotably at one end to the aircraft seat and at the other end has a rotatably attached video display. There is therefore the option of pivoting the video arm out of a storage position into a use position and of rotating a video display into a viewing position for viewing by a person sitting on the aircraft seat.

SUMMARY OF THE INVENTION

The invention is based on the object of designing a holding device for a display and/or operating unit to be easier to use.

The invention is based on a holding device for a display and/or operating unit for use in an aircraft on an aircraft seat, which holding device has a holding arm and an attachment device and a coupling unit for attaching the display and/or operating unit.

One end region of the holding arm is attached to the attachment device so as to be pivotable about an axis of rotation. The coupling unit for pivotably connecting the display and/or operating unit is provided on the opposite end region of the holding arm. The holding arm can take up a use position and a storage position on the attachment device.

The essence of the invention now consists in that a spiral spring unit is arranged between the attachment device and the holding arm in such a manner that a torque is exerted on the holding arm by the spiral spring unit.

The torque preferably assists a movement of the holding arm from the storage position into the use position. The use position is the position in which a person uses the display and/or operating unit, in particular in an aircraft. The display and/or operating unit is then preferably located in front of the person in the sitting direction. In the storage position, the holding arm is pivoted away, for example, next to a seat and is held securely locked in this position by the touch-latch system.

Furthermore, it is advantageous if the spiral spring unit is arranged around the axis of rotation of the holding arm, wherein the spiral spring unit is supported on one side on the attachment device and on the other side on the holding arm. The spiral spring unit can therefore be integrated in a particularly space-saving manner, in particular within the contour of the holding arm and/or of the attachment device.

In order, for example, to avoid an unintentional dropping of the holding arm together with, in particular, the video unit back in the direction of the locking position, it is furthermore proposed that a friction brake arrangement which acts between holding arm and attachment device is provided. It is preferred here if the friction brake arrangement is arranged between a rotational surface of the holding arm and the attachment device. Accommodation of the friction brake arrangement between a rotational surface on the holding arm and an attachment device surface which is stationary relative thereto is conceivable. For example, the friction brake arrangement is arranged between a surface of a rotational bolt of the holding arm and a surface of a bearing sleeve on the attachment device, in which the rotational bolt rotates, or the other way around, if the rotational bolt is provided in a fixed position on the attachment device.

The spiral spring unit is advantageously accommodated in the holding arm, in particular in a cavity or a cutout in the holding arm.

In order to obtain a space-saving, compact construction, it is furthermore proposed that the spiral spring unit surrounds the friction brake arrangement.

For the dimensioning of the spiral spring unit, it is also proposed that the spiral spring unit exerts a torque of >500, >700, >900>1000 Nmm on the holding arm. The torque of the spiral spring unit is preferably within a range of 250 Nmm to 2500 Nmm.

The friction brake arrangement is advantageously configured in such a manner that the moment of friction of the friction brake arrangement is >1000, >1500, >2000, >2500 Nmm, preferably approximately 3000 Nmm. The moment of friction of the friction brake arrangement can lie within a value range of 1000 to 10000 Nmm.

It is furthermore preferred for the holding arm to be pivotable on the attachment device between the use position and storage position which differs by a predetermined pivoting angle. For example, the pivoting angle is >100, >110, >120, >130, >140, >150°, and the pivoting angle is preferably approximately 160°. In particular, the pivoting angle is <210°, <190° or 180°.

In an also advantageous embodiment of the invention, the torque of the spiral spring unit and the moment of friction of the friction brake arrangement and the weight of the holding arm with a display and/or operating unit mounted thereon, in particular a video display, are coordinated with one another in such a manner that the holding arm is pushed into a use position.

The friction brake arrangement preferably has a free wheel in the direction of the use position. That is to say, the friction brake unit essentially does not exert any moment of friction on the holding arm in the direction of the use position, but the moment of friction comes into action in the opposite direction.

It is furthermore preferred if the torque of the spiral spring unit and the moment of friction of the friction brake arrangement (and the weight of the holding arm with a display and/or operating unit mounted thereon are coordinated with one another in such a manner that the holding arm is pushed out of a storage position.

The spiral spring unit is furthermore dimensioned in such a manner that it not only moves the holding arm out of the storage position but pushes the holding arm into the use position and is automatically held in said used position by the torque of the spiral spring unit when the holding arm has been brought in particular manually into the use position. Between the storage position and the use position, the torque of the spiral spring unit preferably assists a manual movement of an operator when moving the holding arm into the use position. By means of a free wheel during the movement into the use position, the friction brake arrangement is preferably not effective. However, when the holding arm is moved from the use position into the locking position, the friction brake arrangement is preferably intended to prevent the holding arm, in particular if the latter has been let go of on the path into the locking position, from dropping back into the latter too rapidly, and damage possibly being caused.

BRIEF DESCRIPTION OF THE DRAWINGS

A plurality of exemplary embodiments are illustrated in the figures and are described in more detail below with advantages and further details being indicated.

DETAILED DESCRIPTION OF THE INVENTION

Figure 1:
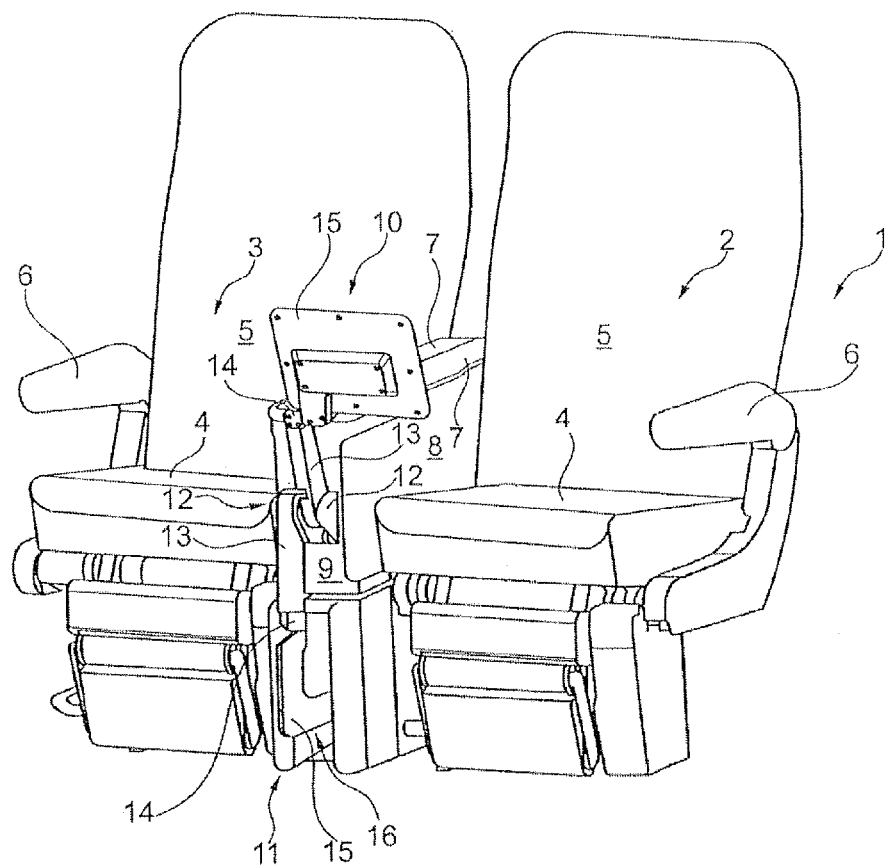
FIG. 1 shows a pair of aircraft seats with video arms according to the invention in a perspective illustration.

FIG. 1 illustrates a pair of aircraft seats 1, for example for use as a seat row in an aircraft. The pair of aircraft seats 1 comprises two aircraft seats 2, 3 each having a seat surface 4, a backrest 5 and armrests 6, 7. A wall unit 8 on which the armrests 7 are arranged is provided between the seats 2, 3. In addition, two video arms 10, 11 are mounted on the front side 9, wherein the video arm 11 is illustrated arranged in a locked storage position on the left seat 3, and the video arm 12 is illustrated arranged in the use position on the right seat 2.

Each video arm 11, 12 comprises a base plate 12 which is mounted on the front side 9 of the wall unit 8. A holding arm 13 is in each case arranged pivotably thereon. A respective coupling unit 14 for the pivotable arrangement of a video display 15 is provided at the front end of the holding arm 13.

Figure 2:
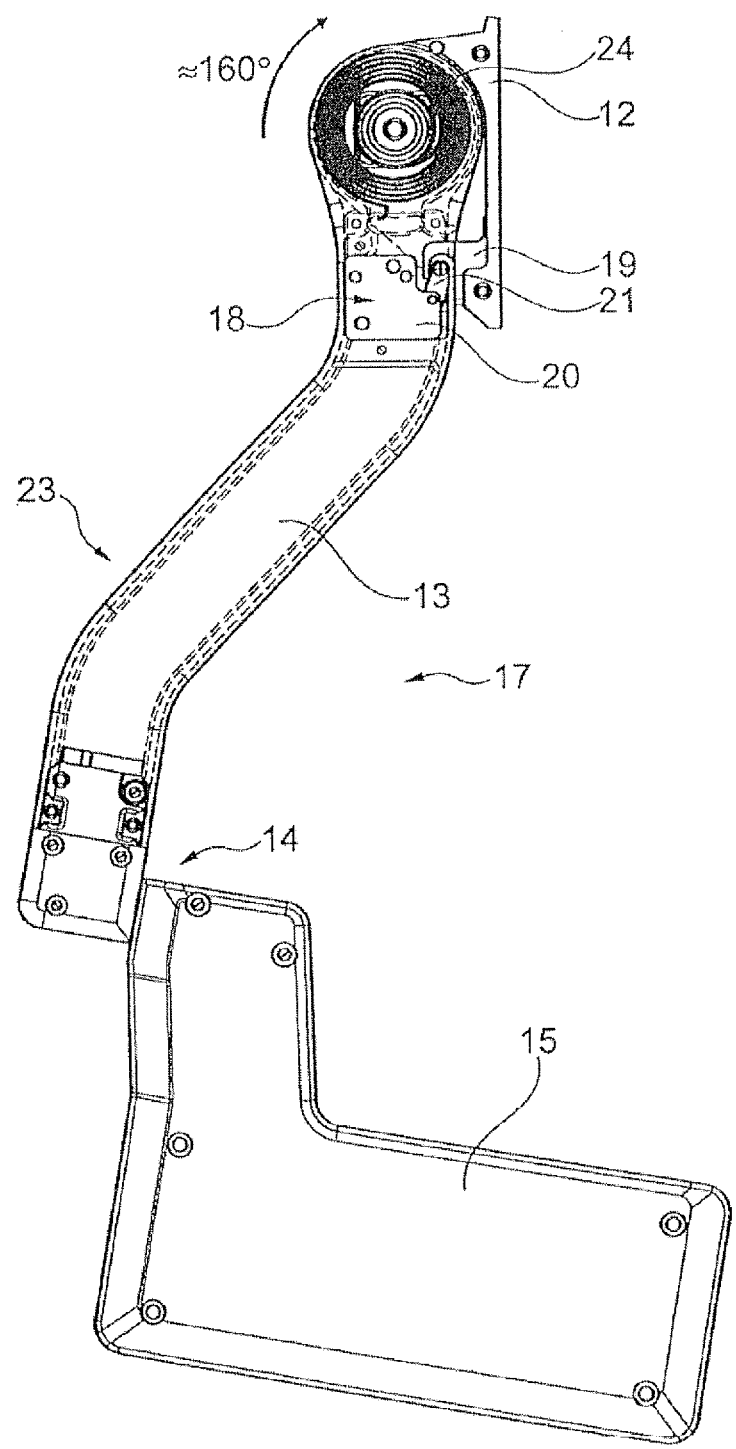
FIG. 2 shows a holding arm with a video display on an attachment device in the storage position, as viewed from the side.

In the locked storage position, as shown for the left video arm 11, the video display 15 is pivoted, in a manner oriented longitudinally with respect to a sitting direction, into a clearance zone 16 of the wall unit 8 below the seat surface 4 of the aircraft seat 2, 3. FIG. 2 illustrates a video arm 17 in a storage position corresponding to the position of the video arm 11 according to FIG. 1, together with further details, in a partially cut-open form and without the seat structure. Such a video arm 17 could be used for the seats 2, 3.

A sitting direction is located in the image plane. One end of the holding arm 13 is mounted pivotably on the base plate 12. The coupling unit 14 for the pivotable arrangement of the video display 15 is provided at the opposite end of the holding arm 13. The video display 15, for example in the unfolded state of the holding arm 13, as shown for the video arm 10 in FIG. 1, can be pivoted via the coupling unit 14 out of the image plane into the use position in front of a person who is sitting on a corresponding aircraft seat.

A touch-latch system 18 is provided between the base plate 12 and the holding arm 13.

The touch-latch system 18 comprises a hook-in member 19, which is mounted fixedly on the base plate 12, and a cardioid unit 20 with a locking lever 21.

Figure 3:
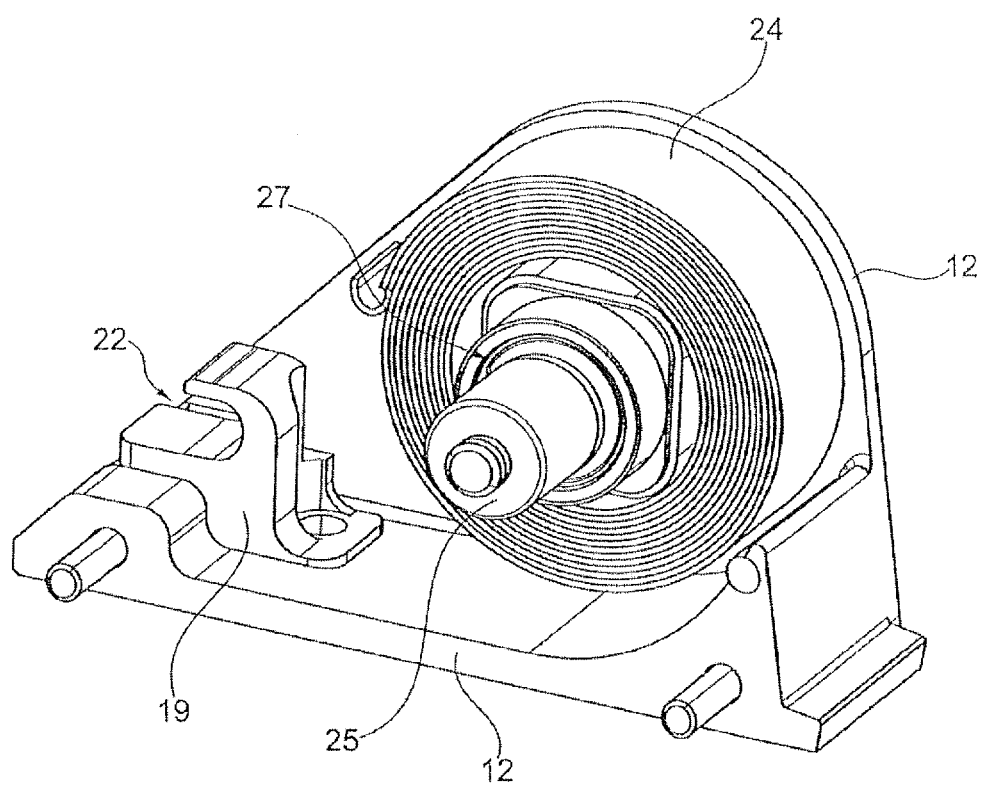
FIG. 3 shows, in a perspective illustration, an attachment device without a holding arm.

FIG. 2 illustrates the locking lever 21 in a locked position in which said locking lever engages behind a recess 22 of the hook-in member 19 (see FIG. 3).

In order to pivot the holding arm 13 together with the video display 15 out of the storage position, an operator pushes the holding arm 13 beyond the storage position in the arrow direction 23, as a result of which a cardioid (not illustrated) releases the locking lever 21 such that the latter can pivot, and therefore the holding arm 13 can be pivoted out.

The locking lever 21 can be spring-loaded, as a result of which, after the unlocking, the spring pushes the holding arm 13 out of the storage position in the direction of the use position.

Reliable functioning of the cardioid mechanism in the cardioid unit 20 is therefore also ensured.

In addition, or else optionally also only by means of a spiral spring 24 (also see FIG. 3), which is wound up in a position of the holding arm 13 according to FIG. 2, that is to say is tensioned, and pushes the holding arm out of this position into the use position, the holding arm can be "ejected" in the direction of the use position.

After unlocking of the touch-latch system 18, the spiral spring 24 can not only assist the "ejection operation", but also a further manual movement of an operator when pivoting the holding arm into a use position. In addition, the torque of the spiral spring 24 can preferably be dimensioned in such a manner that, in a pivoting state of the video arm according to the video arm 10 in FIG. 1, the video arm is automatically held in this position by the force of the spiral spring 24.

The holding arm 13 is preferably connected fixedly to a rotational bolt 25 (see FIG. 3) which is arranged rotatably in a cylindrical cutout 26 in the base plate 12. A friction brake arrangement 27 is formed between the cylindrical cutout 26 and the rotational bolt 25. Said friction brake arrangement 27 produces a holding force, in particular when the holding arm 13 is transferred from a use position into the storage position, and therefore said holding arm 13 does not simply drop back in the direction of the storage position, but rather this movement is damped by the friction brake arrangement 27.

The friction brake arrangement is merely indicated in FIG. 3.

Figure 4A:
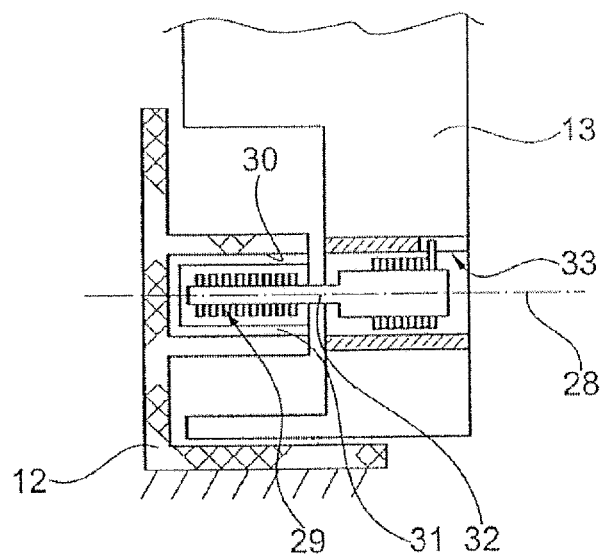
FIGS. 4a to 4c show a coil spring arrangement between holding arm and attachment device in a sectional view (FIG. 4a), only the coil spring with respect to a shaft in a partially perspective view (FIG. 4b), and a sectional view perpendicularly to the pivot axis of the pivot arm through the coil spring (FIG. 4c).
Figure 4B:
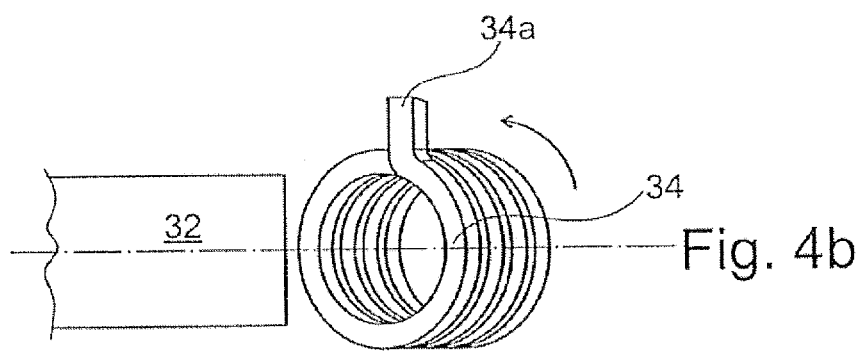
Figure 4C:
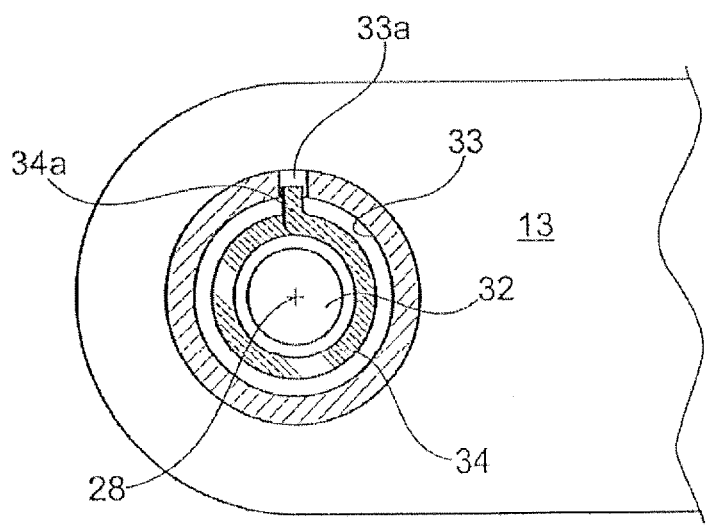

In addition to the friction brake arrangement 27 according to FIG. 3, which acts both when the holding arm 13 is pivoted in and pivoted out, a coil spring arrangement according to FIGS. 4a to 4c is conceivable, said coil spring arrangement producing a clamping moment in one direction whereas a free wheel is realized in the other direction.

In a sectional image along a pivot axis 28 of the holding arm 13 in the base plate 12, FIG. 4a shows a friction brake arrangement 29 which is arranged in a cutout 30 in a cylindrical receptacle 31.

The friction brake arrangement 29 acts on a rotational bolt 32 which protrudes from the holding arm 13 and is likewise mounted rotatably therein in a cylindrical receptacle 33 of the holding arm 13.

The connection between rotational bolt 32 and cylindrical receptacle 33, which is part of the holding arm 13, takes place via a coil spring 34, which is apparent in a section perpendicularly to the pivot axis 18 in FIG. 4c.

The coil spring 34 is held at one end 34a in a recess 33a of the cylindrical receptacle 33, for example by the end of the cylindrically coiled coil spring 34 being inserted in an angled manner therein.

If the inner side of the coil spring 34 is brought into frictional contact with a surface of the rotational bolt 32, which surface rotates in the coiling direction, the coil spring 34 contracts, as a result of which the rotational bolt 32 is clamped, in the most extreme case, or else can be rotated further therein only with very great difficulty.

By contrast, in the opposite direction of rotation, the coil spring expands, and the rotational bolt 32 can be moved very easily in the coil spring 34.

The coil spring 34 can be provided in such a manner that, when the holding arm 13 is pivoted out of a storage position into a use position, the coil spring 34 is expanded, and therefore the latter essentially does not exert any dynamic effect on a rotational bolt moving therein and the friction brake arrangement does not become effective. By contrast, during a movement back out of the use position into the storage position, the coil effect becomes active and clamps the rotational bolt 32, as a result of which the holding arm 13 drops back into the storage position in a movement braked in a defined manner by means of the friction brake arrangement 27, which is therefore effective, even when the holding arm has been let go of in a horizontal orientation of the holding arm.

LIST OF REFERENCE NUMBERS

1 pair of aircraft seats
2 aircraft seat
3 aircraft seat
4 seat surface
5 backrest
6 armrest
7 armrest
8 wall unit
9 front side
10 video arm
11 video arm
12 base plate
13 holding arm
14 coupling unit
15 video display
16 clearance zone
17 video arm
18 touch-latch system
19 hook-in member
20 cardioid unit
21 locking lever
22 recess
23 arrow
24 spiral spring
25 rotational bolt
26 cutout
27 friction brake arrangement
28 pivot arm
29 friction brake arrangement
30 cutout
31 cylindrical receptacle
32 rotational bolt
33 cylindrical receptacle
33*a* recess
34 coil spring
34*a* end

The invention claimed is:

1. A holding device for a display and/or operating unit for use in an aircraft on an aircraft seat, with a holding arm and an attachment device, a friction brake arrangement which acts between the holding arm and the attachment device, and a coupling unit for connecting the display and/or operating unit, wherein one end region of the holding arm is provided on the attachment device so as to be pivotable about an axis of rotation and the coupling unit for pivotably connecting the display and/or operating unit is provided on the opposite end region of the holding arm, and wherein the holding arm can take up a use position and a storage position on the attachment device, wherein a spiral spring unit surrounds the friction brake arrangement arranged between the attachment device and the holding arm in such a manner that a torque is exerted on the holding arm by the spiral spring unit.

2. The holding device according to claim 1, wherein the spiral spring unit is arranged around the axis of rotation, wherein the spiral spring unit is supported on one side of the attachment device and on the other side on the holding arm.

3. The holding device according to claim 1, wherein the friction brake arrangement is arranged between a rotational surface of the holding arm and the attachment device.

4. The holding device according to claim 1, wherein the spiral spring unit is arranged in the holding arm.

5. The holding device according to claim 1, wherein the spiral spring unit exerts a torque of >500 Nmm on the holding arm.

6. The holding device according to claim 1, wherein the moment of friction of the friction brake arrangement is >1000 Nmm.

7. The holding device according to claim 1, wherein the holding arm is pivotable on the attachment device between the use position and storage position which differs by a predetermined pivoting angle.

8. The holding device according to claim 1, wherein the torque of the spiral spring unit and the moment of friction of the friction brake arrangement and the weight of the holding arm with a display and/or operating unit mounted thereon are coordinated with one another in such a manner that the holding arm is pushed into a use position.

9. The holding device according to claim 1, wherein the torque of the spiral spring unit and the moment of friction of the friction brake arrangement and the weight of the holding arm with a display and/or operating unit mounted thereon are coordinated with one another in such a manner that the holding arm is pushed out of a storage position.

10. A display and/or operating device with a holding device according to claim 1 and a display and/or operating unit arranged thereon.

11. The holding device according to claim 1, wherein the spiral spring unit exerts a torque of >700 Nmm on the holding arm.

12. The holding device according to claim 1, wherein the spiral spring unit exerts a torque of >900 Nmm on the holding arm.

13. The holding device according to claim 1, wherein the spiral spring unit exerts a torque of >1000 Nmm on the holding arm.

14. The holding device according to claim 1, wherein the moment of friction of the friction brake arrangement is >1500 Nmm.

15. The holding device according to claim 1, wherein the moment of friction of the friction brake arrangement is >2000 Nmm.

16. The holding device according to claim 1, wherein the moment of friction of the friction brake arrangement is >2500 Nmm.

17. The holding device according to claim 1, wherein the moment of friction of the friction brake arrangement is about 3000 Nmm.

* * * * *